July 17, 1962 L. A. DOW ET AL 3,044,957
POROUS SEPARATOR MEDIA
Filed June 1, 1959

INVENTORS
Lester A. Dow
Arthur R. Fredrickson
Robert D. Parsons
BY Charles B. Willson
ATTORNEY

3,044,957
POROUS SEPARATOR MEDIA
Leslie A. Dow, Seekonk, Mass., Arthur R. Fredrickson, West Warwick, R.I., and Robert D. Parsons, Westwood, Mass., assignors of one-half to Fram Corporation, East Providence, R.I., and one-half to Hollingsworth & Vose Company, East Walpole, Mass., a company of Massachusetts
Filed June 1, 1959, Ser. No. 817,224
3 Claims. (Cl. 210—508)

This invention relates to the separation of immiscible liquids such as a hydrocarbon liquid and water, and more particularly to a porous separator media that is pervious to one liquid but not to the other and will separate such liquids rapidly and efficiently.

Liquid separators are now extensively used in the aviation field and in other fields to remove mechanically contained water from liquid fuel such as gasoline and jet fuel. The separation is effected by taking advantage of the interfacial tension value between the liquids. An important use of such separators is to free the fuel of water before the fuel is pumped into the tanks of an airplane, but the invention may be used in various fields to remove water from hydrocarbon liquids. It is well known that water tends to enter fuel as moisture from the air and from other sources. If a plane is flown at high altitudes where the temperature is far below zero, water in the fuel may freeze. This can be very serious because if there is only a small amount of water in the fuel, and this water freezes, it may block the flow of fuel to the engine and cause engine failure.

The liquid separators now in general use to free gasoline and other fuels of water mechanically contained therein are usually of the two-stage type comprising: (1) a coalescer that serves to remove dirt from the fuel and cause the minute particles of contained water to coalesce into large droplets, and (2) a separator media that will pass the fuel but block the water particles. These separators work very well to free gasoline of water and many such separators have a flow rate of 600 gallons per minute or higher.

However, today planes are being built to use jet fuel rather than gasoline, and jet fuel is much harder to free of mechanically contained water. Therefore, the separators now in use to remove water from gasoline are not satisfactory to remove water rapidly from jet fuel such as JP-5.

The first stage or coalescer elements now in use in such liquid separators are reasonably satisfactory to treat jet fuel as well as gasoline. Difficulty occurs with the second stage elements which are designed to pass the fuel but block the water, as these second stage elements will pass jet fuel too slowly to meet present day refueling requirements.

Having in mind the foregoing, the present invention contemplates a porous paper type of separator media which is far superior to any porous paper type separator media used herebefore. The separator media contemplated by the present invention permits a flow rate for heavy fuel such as JP-5 of over five times the flow rate per unit area of the best paper separator media used heretofore in two-stage liquid separators.

In the field of separating water from hydrocarbon liquids such as airplane fuel where large quantities of such fuel are used, there is an urgent need of high capacity separators that will permit rapid plane refueling. The present invention makes possible a faster refueling of airplanes and other equipment using large quantities of jet fuel.

In this field of liquid separation, it is commonly accepted that the maximum pore size of the separator media should be smaller than the smallest water droplets that will reach the media. To insure this condition, it is in most cases essential to coalesce the very fine water particles in the fuel to a size greater than that of the largest pores of the separator media.

In the general type of two-stage liquid separators above referred to, the first stage or coalescer performs a dual function in that it coalesces the water particles, and removes the dirt from the stream. If this dirt is allowed to reach the separator media and lodge on its surface it will seriously interfere with its separating operation.

It is possible to provide a separator media that will permit fuel to pass rapidly therethrough by forming such media with large pores, but in this case, water will pass through such large pores unless the water droplets are coalesced to a large size. This would place a heavy burden on the coalescer and slow down the separating operation. On the other hand, if the separator media is provided with very small pores, less burden is placed on the coalescer but the flow of fuel through the fine pores will be very slow.

The present invention makes available a separator media in the form of a porous paper having relatively fine but numerous pores per unit area to block the water carried by the fuel. This sheet, because of its numerous pores, permits a rapid flow of the fuel through the paper. For example, by employing the present invention, it is possible to provide a separator paper having a maximum effective pore size such as 50 microns in diameter but through which paper the hydrocarbon liquid can pass at a much higher rate per unit area than in the case of the filter media available heretofore having the same maximum pore size. This high flow rate is due to the large number of pores near such maximum size per unit area. The phrase "50 microns in diameter" refers to the diameter of a circular pore which has the same bubble pressure as the pore in question.

Having in mind the foregoing, we have found that it is possible to provide a paper-like separator media which has the fine pore size needed to block relatively small particles of water, and at the same time has a high porosity to permit a high flow of a hydrocarbon liquid therethrough.

A separator media having these highly desirable properties can be produced by forming a paper-like sheet entirely or substantially entirely of relatively small fibers that are highly uniform in diameter. It is believed such sheet for best results should be formed primarily of fibers that are from about 8 to 12 microns in diameter. Esparto fibers which range in diameter from about 8 to 12 microns and are about 1.5 millimeters long are preferred to form such sheet, but yucca fibers and short glass fibers within the diameter range of about 8 to 12 microns may be used to form the separator media. For a further description of esparto fibers and yucca fibers, and the source of such fibers, reference is had to the McGuff et al. Patent No. 2,708,982.

Conventional pulp laying equipment may be used to form a sheet of these fibers. They may be water laid, air laid or otherwise formed into a sheet. The sheet, however, should be made as uniform as possible so that its pores will approach, but not exceed the desired maximum pore size, and the number of such pores should be high per unit area. The size of the pores can be controlled to some extent by increasing or decreasing the pressure of the press rolls while producing the sheet.

The thickness of the separator sheet is not of prime importance, as it is the effective size of each pore that determines the pressure required to overcome the interfacial tension value and force water through the pores of the sheet. Therefore, the thickness of the paper need be no greater than is needed to give the paper the desired strength and optimum porosity. A thicknss of about .02" is satisfactory, although thicknesses of .01" to .03" may be used.

So far as the performance of the separator media herein contemplated is concerned, it may be formed entirely of the 8 to 12 micron fibers above mentioned, but since a sheet of such fibers is hard to handle on the usual paper-forming equipment, it may be desirable to add to its fibers 30% by weight or less of cotton linter fibers, wood fibers, or other diluent fibers of greater length and/or diameter to strengthen the sheet. It is found that the flow characteristics of the separator media herein contemplated may be improved further if the esparto or yucca fibers are causticized to impart a permanent kink to the fibers. This kink will add loft to the sheet and give it greater porosity.

The speed and efficiency of such separator media for removal of water from fuel will depend: (1) upon the lay of the fibers in the sheet so as to provide a maximum number of apertures to the square inch, which apertures approach but do not exceed a predetermined pore size, and (2) upon the resin treatment of the fiber media used to give the fibrous sheet the required strength, and water and solvent-resistant properties without appreciably re-reducing the size of the pores.

The separator media contemplated by the present invention should be rendered water repellent if it is to pass the fuel but block the coalesced water particles therein. A simple and highly satisfactory means of imparting water repellent properties to the sheet is to treat it with a phenol formaldehyde or epoxy or other resin to impart strength to the sheet and render it water resistant, and to also treat the sheet with such a material as a silicone to render it water repellent. The silicone can be mixed with the phenol formaldehyde or other resin and applied to the sheet forming fibers. From about ½ to 3% of silicone and about 15% to 30% of the phenol formaldehyde or other resin based on total finished weight of the sheet may be used. The resin used should be substantially insoluble in water and in the hydrocarbon liquid that will contact the sheet. The silicone also helps the water particles to free themselves readily from the sheet under the influence of gravity and the wiping action of the liquid stream.

The following specific example is intended to illustrate more clearly the operation of the separator sheet of the present invention and is not intended as a limitation upon the scope thereof.

*Example*

A rotary digester was charged with 2700 pounds, air dry, of esparto pulp. Then 450 gallons of 50% liquid caustic (equal to 2880 pounds of dry caustic), and 1050 gallons water were added to the digester. The digester was then rotated at room temperature for 3 hours and the causticized stock was dumped.

Of the causticized esparto thus prepared, 1200 pounds (equivalent bone dry) was put into a beater and washed with warm water to a pH of 7-9. 134 pounds (equivalent bone dry) of cotton linter pulp (sheet form) was added to the washed causticized esparto and broken up with the beater roll in the raised position. The resulting pulp slurry was then passed through a Jordan with the plug out, and onto the wire of a Fourdrinier machine where a web of interfelted randomly oriented esparto fibers approximately .015" thick having a basis weight of 60 pounds (500 sheets 24" x 36") was formed. The product contained 90% causticized esparto and 10% cotton linters fibers by weight.

The above sheet product was subsequently treated with a phenolic resin solution containing silicone resin to render it hydrophobic using standard saturating equipment. The web may be run through a saturating bath, reverse roll saturator or other type of saturating equipment. The thermosetting phenol-formaldehyde resin, sold under the name Synco 262BD in the form of a concentrated alcoholic solution, was diluted to the proper saturating concentration with isopropyl alcohol (91%). The silicone resin, a methyl-hydrogen polysiloxane sold by Advance Coatings under the name Silicone 5345 resin in the form of a 50% solids emulsion in water, was added directly to the diluted phenolic resin solution. After saturating, the saturated web was dried in a forced hot air oven to a volatile content of 5% to 10%. A typical sheet treated as described above contains 20%-25% of phenol formaldehyde resin and 2%-3% silicone.

The above example is intended for illustration only and as such does not limit the proportion or types of any or all of the fibers, in any way. Diluent fibers other than cotton linters may be used, such as wood, synthetic fibers, such as acetate rayon, viscose rayon, fibers of vinyl polymers and copolymers, particularly copolymers of vinyl chloride and vinyl acetate, and rope fibers.

The concentration of aqueous caustic solution used to causticize the esparto fibers may vary from 18% to 22% by weight, and the temperature at which causticization is carried out may range from about 60° to 90° F. The duration of the causticization step is not critical; the treatment usually is complete in three hours, but longer times may be used. The washing operation is continued until the pH of the pulp is reduced below 9. This operation can be accelerated by the use of a small amount of acid, provided the final pH of the pulp is no lower than about 6.

Subsequent resin treatment for water and solvent resistance of separator paper as stated above are also for illustration only and are not meant to limit proportions, types or quantities of resins in any way.

While up to 30% by weight of diulent fibers may be employed, as pointed out above, it has been found that the bubble pressure P and the SVN product of the separator sheet decreases as the quantity of diluent fiber present increases.

It is highly desirable to provide a simple procedure for testing porous separator media to determine in advance how the same will perform in an actual liquid separator. We have found that the performance of such media can be accurately predicted if two simple tests are made; one to determine the Frazier permeability of the media, and the other to determine the "bubble pressure" of the media to thereby determine the maximum pore size of the sheet.

The Frazier permeability can be determined by taking a sample of the separator media of any desired size, such as two inches in diameter, and placing its outer peripheral portion in sealing engagement with the upper end of an open-ended vacuum chamber so that a slight vacuum can be produced in the chamber below the separator media to draw air downwardly through the media. In the bottom of this chamber is placed a diaphragm having a calibrated orifice therethrough. A set of such diaphragms having different size orifices are supplied with the testing device and a diaphragm is used that will permit a flow of air in cubic feet per minute within the range of the separator sheet to be tested. A differential pressure manometer is provided to give the difference in pressure across the orifice. The device is operated to determine the rate of flow of air required to maintain a partial vacuum under the separator media equal to 0.5 in. $H_2O$ below atmosphere. The reading thus secured gives the air permeability of the separator media being tested. This permeability reading is hereinafter designated by "F" wherein $F$=Frazier permeability (c.f.m./ft.$^2$/0.5 in. $H_2O$). The Frazier air permeability tester was designed to measure the porosity of textile fabrics, but it is also well adapted to test the permeability of paper. A reference to this tester can be found in the ASTM Standards 1952, Part 7, page 175, titled, "Standard Method of Test for Air Permeability of Textile Fabrics" (ASTM designation D-737-46).

The bubble pressure can be determined by taking the same media sample that was used in the Frazier test and clamping the outer peripheral portion of the sheet in a horizontal position so that a layer of oil can be formed over the media. Then a slight air pressure is established at the lower face of the sheet and the pressure is gradually increased until the first persistent air bubbles pass upwardly through the media and oil covering the same, and noting the pressure at which this occurs. The detailed procedure preferably used for determining such bubble pressure is hereinafter described.

The above and other features pertaining to the invention will be further understood from the following description when read in connection with the accompanying drawing, wherein.

Figure 1:
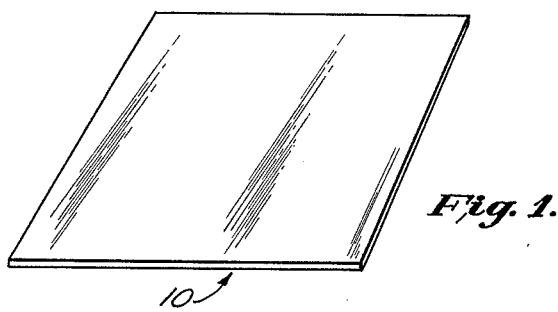
FIG. 1 is a perspective view of a sheet of separator paper embodying the present invention.

The sheet of paper shown in FIG. 1 and designated by 10 is formed as above described, and due to the number and the size of the pores per unit area of the sheet and its water repellent properties, it is well adapted for use as a separator media to remove water from a hydrocarbon liquid.

Figure 2:
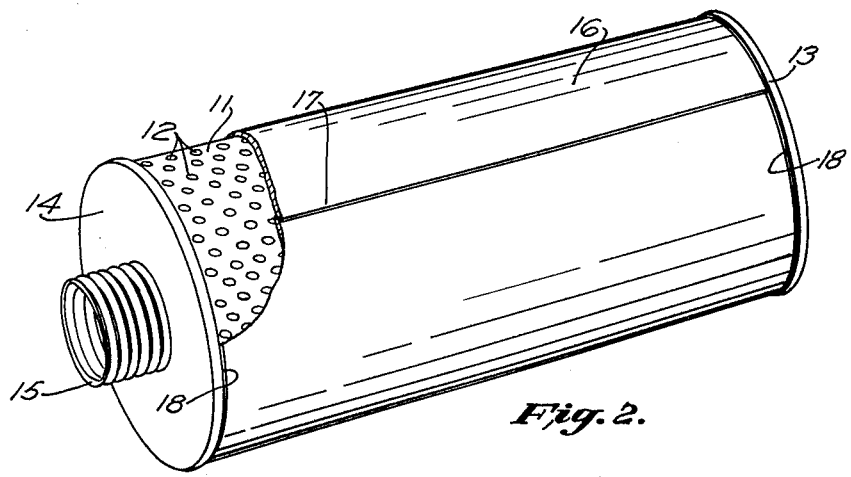
FIG. 2 is a perspective view of a cylindrical liquid separator cartridge using the separator paper of FIG. 1.

This separator media 10 may be used in the form of a disc, or a cone, or other shape, but is preferably used in the form of a cylinder as shown in FIG. 2, and employed as the second stage or separator element in a liquid separator.

Now referring to FIG. 2, the numeral 11 designates a sheet metal cylinder having the perforations 12. This cylinder is closed at one end by the end disc 13 and the other end is closed by the disc 14. The disc 14 has the outwardly projecting threaded sleeve 15 by means of which the cylinder device may be secured to a supporting member, such for example, as a deck plate of a liquid separator. The entire perforated member 11 is covered with a sheet of porous separator paper 16 of the type shown in FIG. 1. This paper is placed about the cylinder so that its edges overlap, as at 17 and these overlapping edges are cemented one to the other. One end of the cylindrical sleeve formed by the paper is cemented at 18 to the underlying support 11 close to the head 13, and the other end is similarly cemented to the support 11 close to the head 14. The flow through the separator cartridge thus produced is in an outside-in direction so that the liquid that passes through the paper 16 and enters the interior of the perforated cylindrical support 11 can leave through the threaded sleeve 15.

The cylindrical separator cartridge of FIG. 2 may be installed so that its axis extends either horizontally or vertically. In either case, the water suspended in the fuel that surrounds this cartridge and stopped by the paper 16 will be removed from the outer wall of the paper by gravity and the wiping action of the moving fuel.

Figure 3:
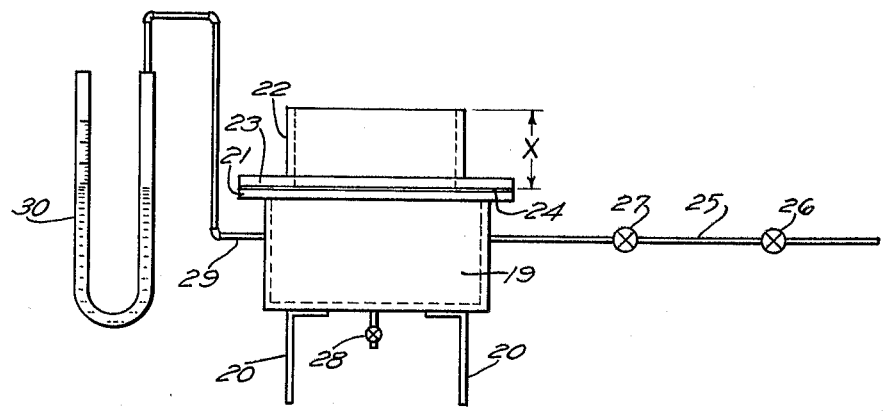
FIG. 3 is a diagrammatic side view of a paper testing device used to determine the bubble pressure of a sheet of paper.

The testing device of FIG. 3 is shown and described to make clear how applicants prefer to determine the bubble pressure of the separator media forming the subject matter of the present invention. Such bubble pressure is important, as it indicates the size of the larger pores of the sheet being tested, and as above stated the maximum pore size of the separator media should be smaller than the smallest water droplets that will reach the media.

The testing device of FIG. 3 preferably comprises a hollow cylindrical body 19 of metal having a three inch inside diameter. This device may be supported by legs 20. The body 19 has an upper flange 21 so that the annular upper member 22 having the flange 23 may rest thereon. Between the flanges 22 and 23 is placed the separator sheet 24 to be tested, such as the sheet 10 of FIG. 1. The flanges are clamped together to form a seal against the paper. Air under pressure can be supplied to the body 19 by the air line 25 having a pressure relief valve 26 and a pressure regulating valve 27. Leading from the body 19 is the petcock 28, and also leading from this body is a line 29 connected to the water manometer 30 for 0″ to 36″ water reading.

A hydrocarbon fuel such as JP–5 having a surface tension of 26.0 dynes per centimeter and known specific gravity was used for the test. In making a test, a sample of the separator filter media which has been cured in an air circulating oven at recommended time and temperature to properly cure the resin in the sheet is used. This sheet is placed in the position indicated by 24 in FIG. 3 and tightly clamped in this position. Then with petcock 28 open, a small amount of fuel (JP–5) is poured into the well formed by the member 22 to fill the pores of the paper 24. Then the petcock 28 is closed and air pressure is slowly applied until the manometer reaches a reading of from 1½″ to 2″ of water pressure. More (JP–5) fuel is poured into the well of the member 22 until the well is full, so that the oil head on the paper has the height indicated by X in FIG. 3 of the drawing. Then the air pressure is increased slowly until the first bubble of air breaks through the media. All bubbles occuring at the extreme edge of the sheet due to excessive clamping pressure are ignored. The reading from the water manometer when the first bubbles rise through the fuel is recorded.

The water manometer reading is corrected by subtracting the pressure head of the fuel above the medium. This pressure head is calculated by multiplying the head (X on the drawing) by the specific gravity of the particular fuel used.

The reading in inches of water thus secured is the bubble pressure of the separator media for the fuel used, and in order for the media to be highly effective as a separator, the bubble pressure indicated by P should be at least 7 and preferably considerably higher.

We have determined that the maximum rate of flow of liquid hydrocarbon which is tolerated by a separator media without loss of effectiveness of operation is directly proportional to the product of the bubble pressure and the Frazier porosity. This product of $P \times F$ is herein referred to as the "separator velocity number"—SVN. This number accurately indicates the performance of the separator media in actual operation in a liquid separator as will appear from the following table, wherein, by comparing the ratio of the SVN reading with the maximum g.p.m. flow, which is possible without loss of effectiveness of separation for the test sheets 1, 2, and 3, it will be seen that the ratio is approximately eight to one for each sheet.

| Test | Sq. Ft. Area | P | F | SVN | Actual Maximum g.p.m. Flow |
|---|---|---|---|---|---|
| 1 | 1.3 | 11 | 4 | 44 | 6 |
| 2 | 1.3 | 16 | 10 | 160 | 20 |
| 3 | 1.3 | 10 | 24 | 240 | 30 |

In this table, Test 1 was a commercial separator media of good performance by present day standards prior to this invention. Test 2 was an uncausticized esparto media. Test 3 was causticized esparto media such as contemplated by the present invention. In each case, the media being tested for actual maximum flow was in the form of a cylinder placed around a perforated supporting core and sealed at each end and along the longitudinal meeting edges of the cylinder as shown in FIG. 2 of the drawing. This cylinder was 3½″ in diameter and 18″ long and had an effective area of 1.3 square feet. P, as above stated in the table, is the bubble pressure reading and F is the Frazier permeability reading. SVN is the product of $P \times F$. The "actual maximum g.p.m. flow" is the flow rate obtained during an actual liquid separator test carried out on the media in the form described above. If the SVN reading of 44 is compared with the SVN of 160 and the SVN of 240, it will be seen that the uncausticized sheet is over 3½ times as efficient as the previous commercial sheet, and the causticized esparto sheet is approximately 5½ times as efficient as the previous commercial sheet. The sheet of Test 3 in an actual test removed all of the water from a 1% water JP–5 mixture at a flow rate in excess of 20 g.p.m. per square foot.

The pressure drop across the separator media when in operation should be high enough to secure a rapid flow of fuel therethrough, but it should not be high enough to force water through the pores. That is, the pressure should not exceed the critical pressure beyond which the water will pass through the media. The temperature of the liquid as it passes through the separator is not critical and may vary considerably. About 70° F. to 90° F. is a good working temperature.

Some of the separator media made heretofore, if tested, would be found to have a high SVN, but the pore size would be large and therefore, the reading P would be low, such as 4 or less. The present invention makes possible the production of a separator paper having a much smaller pore size without reducing substantially the SVN. This highly desired result is secured by forming the sheet of small uniform fibers so as to provide it with small pores, but a very large number of such pores to the square inch. It is this high number of small pores that give the paper a bubble pressure reading of 7 or more as determined by the bubble pressure procedure above described, and a high SVN preferably of 200 or more to secure a high flow of hydrocarbon through the separator media.

The fuel herein referred to in the specification as JP–5 is to be understood to be a high flash-point kerosene type as defined in the military specification MIL–F–5224C, May 18, 1955.

Having thus described our invention, what we claim and desire to protect by Letters Patent is:

1. A filter media for rapidly freeing a hydrocarbon liquid from water mechanically contained therein, comprising a porous water repellent sheet formed of interfelted randomly oriented esparto fibers from 8 to 12 microns in diameter so that these fibers as they lay in the sheet are substantially uniform as to length and diameter and carrying a water repellent chemical so that the sheet will pass the hydrocarbon liquid but block the water at the upstream surface of the sheet, and having a maximum pore size such that its bubble pressure rating is P and its Frazier air permeability is F, wherein P is the bubble pressure of the sheet measured in inches or water and is 7 or more and F is the c.f.m. flow of air per square foot per 0.5 inch of water differential pressure, and $P \times F$ gives a separation velocity number of 240 or more; and wherein said sheet is capable of removing all of the water from a mixture containing 1% of water in a high flash-point kerosene type of fuel having a surface tension of the order of 26.0 dynes per centimeter, a specific gravity of the order of .788 at 60° F. and a viscosity of the order of 2 centistokes at 80° F., and at a flow rate in excess of 20 g.p.m. per square foot.

2. A filter media as defined in claim 1 wherein the esparto fibers are causticized.

3. A filter media substantially as defined in claim 1, wherein the separation velocity number exceeds 200.

References Cited in the file of this patent
UNITED STATES PATENTS

| | | |
|---|---|---|
| 1,716,006 | Rinman | June 4, 1929 |
| 2,648,617 | Hanson | Aug. 11, 1953 |
| 2,707,563 | Kasten et al. | May 3, 1955 |
| 2,708,982 | McGuff | May 24, 1955 |
| 2,834,730 | Painter et al. | May 13, 1958 |
| 2,883,345 | Taylor et al. | Apr. 21, 1959 |
| 2,960,234 | Fredrickson | Nov. 15, 1960 |